(12) United States Patent
Stan et al.

(10) Patent No.: US 8,687,518 B1
(45) Date of Patent: Apr. 1, 2014

(54) AUTOMATIC ADDRESS CONFIGURATION IN A NETWORK TEST SYSTEM

(71) Applicant: Ixia, Calabasas, CA (US)

(72) Inventors: Razvan Stan, Agoura Hills, CA (US); Alex Sidorenko, Chatsworth, CA (US); Thomas Ameling, Woodland Hills, CA (US); Alin-Doru Pancu-Cojocariu, Bucharest (RO)

(73) Assignee: Ixia, Calabasas, CA (US)

( * ) Notice: Subject to any disclaimer, the term of this patent is extended or adjusted under 35 U.S.C. 154(b) by 57 days.

(21) Appl. No.: 13/623,680

(22) Filed: Sep. 20, 2012

(51) Int. Cl.
*H04J 3/14* (2006.01)

(52) U.S. Cl.
USPC .......................................... 370/252; 370/254

(58) Field of Classification Search
USPC ......... 370/252, 254, 250, 392, 389, 396, 397, 370/399, 401, 400, 241.1, 241; 709/222, 709/227, 223, 220, 221, 226, 228
See application file for complete search history.

(56) References Cited

U.S. PATENT DOCUMENTS

| | | | |
|---|---|---|---|
| 7,197,549 B1 * | 3/2007 | Salama et al. | 709/223 |
| 2002/0186698 A1 * | 12/2002 | Ceniza | 370/401 |
| 2003/0012141 A1 * | 1/2003 | Gerrevink | 370/250 |
| 2007/0197169 A1 * | 8/2007 | Viss | 455/67.14 |
| 2008/0091387 A1 * | 4/2008 | Yamazaki et al. | 703/1 |
| 2008/0298367 A1 * | 12/2008 | Furukawa | 370/392 |
| 2009/0276771 A1 * | 11/2009 | Nickolov et al. | 717/177 |
| 2010/0124176 A1 * | 5/2010 | Fan et al. | 370/250 |
| 2011/0035478 A1 * | 2/2011 | Deutsch et al. | 709/222 |
| 2011/0246630 A1 * | 10/2011 | Deutsch et al. | 709/222 |
| 2013/0347103 A1 * | 12/2013 | Veteikis et al. | 726/22 |

* cited by examiner

*Primary Examiner* — Abdullah Riyami
(74) *Attorney, Agent, or Firm* — SoCal IP Law Group LLP; John E. Gunther; Steven C. Sereboff (57) ABSTRACT

A method for managing virtual device addresses and an address manager for a network test system comprising a plurality of ports including a first port. A respective plurality of virtual devices to be emulated by each of the plurality of ports may be defined, each plurality of virtual devices including a respective first virtual device. Addresses may be automatically assigning to each of the virtual devices in accordance with a start value, an intraport pattern, and an interport pattern.

17 Claims, 8 Drawing Sheets

| 700A | | |
|---|---|---|
| Start = | 0.0.0.3 | |
| Intraport = | +1 | |
| Interport = | none | |
| Port | Device | Address |
| 1 | 1 | 0.0.0.3 |
| | 2 | 0.0.0.4 |
| | 3 | 0.0.0.5 |
| | 4 | 0.0.0.6 |
| | 5 | 0.0.0.7 |
| | 6 | 0.0.0.8 |
| 2 | 7 | 0.0.0.9 |
| | 8 | 0.0.0.10 |
| | 9 | 0.0.0.11 |
| | 10 | 0.0.0.12 |
| | 11 | 0.0.0.13 |
| | 12 | 0.0.0.14 |
| 3 | 13 | 0.0.0.15 |
| | 14 | 0.0.0.16 |
| | 15 | 0.0.0.17 |
| | 16 | 0.0.0.18 |
| | 17 | 0.0.0.19 |
| | 18 | 0.0.0.20 |

FIG. 7A

| 700B | | |
|---|---|---|
| Start = | 0.0.0.3 | |
| Intraport = | (+1, +3) | |
| Interport = | none | |
| Port | Device | Address |
| 1 | 1 | 0.0.0.3 |
| | 2 | 0.0.0.4 |
| | 3 | 0.0.0.7 |
| | 4 | 0.0.0.8 |
| | 5 | 0.0.0.11 |
| | 6 | 0.0.0.12 |
| 2 | 7 | 0.0.0.15 |
| | 8 | 0.0.0.16 |
| | 9 | 0.0.0.19 |
| | 10 | 0.0.0.20 |
| | 11 | 0.0.0.23 |
| | 12 | 0.0.0.24 |
| 3 | 13 | 0.0.0.27 |
| | 14 | 0.0.0.28 |
| | 15 | 0.0.0.31 |
| | 16 | 0.0.0.32 |
| | 17 | 0.0.0.35 |
| | 18 | 0.0.0.36 |

FIG. 7B

| 700C | | |
|---|---|---|
| Start = | 0.0.0.3 | |
| Intraport = | (+1, +3) | |
| Interport = | + 0.1.0.0 | |
| Port | Device | Address |
| 1 | 1 | 0.0.0.3 |
| | 2 | 0.0.0.4 |
| | 3 | 0.0.0.7 |
| | 4 | 0.0.0.8 |
| | 5 | 0.0.0.11 |
| | 6 | 0.0.0.12 |
| 2 | 7 | 0.1.0.3 |
| | 8 | 0.1.0.4 |
| | 9 | 0.1.0.7 |
| | 10 | 0.1.0.8 |
| | 11 | 0.1.0.11 |
| | 12 | 0.1.012 |
| 3 | 13 | 0.2.0.3 |
| | 14 | 0.2.0.4 |
| | 15 | 0.2.0.7 |
| | 16 | 0.2.0.8 |
| | 17 | 0.2.0.11 |
| | 18 | 0.2.012 |

AUTOMATIC ADDRESS CONFIGURATION IN A NETWORK TEST SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to defining test configurations and test methods for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1, or physical layer, protocols define the physical (electrical, optical, or wireless) media between nodes of the network and the rules and processes used to access that media. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged. The User Datagram Protocol (UDP) is an alternative layer 4 protocol that provides for delivery of packet streams. UDP connections are stateless and do not provide for reliable delivery.

Layer 7, or application layer, protocols include the Hyper-Text Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In this patent, the term "network under test" (NUT) encompasses all or a portion of a packet switched communications network or one or more network devices within, or for use in, a packet switched communications network. In order to test a NUT, test traffic comprising a large number of packets may be generated and transmitted to and/or through the NUT at one or more ports. Return test traffic transmitted through and/or from the NUT may be received at different ports. The received test traffic may be analyzed to measure the performance of the NUT. In this context, the term "port" refers to a logical entity coupled to the NUT by a communications path. The term "port unit" refers to a module within the network test equipment that connects to the NUT at a port. Thus a "port" encompasses a physical "port unit" and the data and parameters that define and constraint the operation of the port unit during attest session. Each port connected to the NUT may be both a source of test traffic and a destination for test traffic. Each port may emulate a plurality of logical source or destination addresses. Each port may emulate a plurality of network users, clients, peers, servers, or other network devices.

The test traffic may depend on the type of network or device to be tested and the type of test to be performed. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant.

When the NUT operates at a higher layer of the network structure (for example, when the NUT is or includes a server, a server load balancer, a firewall, a network security device that performs packet inspection, or similar network devices), the test traffic may include or be a large plurality of TCP connections or a large plurality of application layer transactions (e.g. HTTP GET transactions).

The first step in testing a NUT is to generate a test configuration. In this patent, a "test configuration" is a data set that defines both a test system and a test procedure to be used to test the NUT. A test configuration may include, for example, data defining the number and types of port units that will be connected to the NUT, the attributes and capabilities of each port, the protocols to be executed by each port, the traffic to be generated by each port, and the test data to be acquired during the test.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
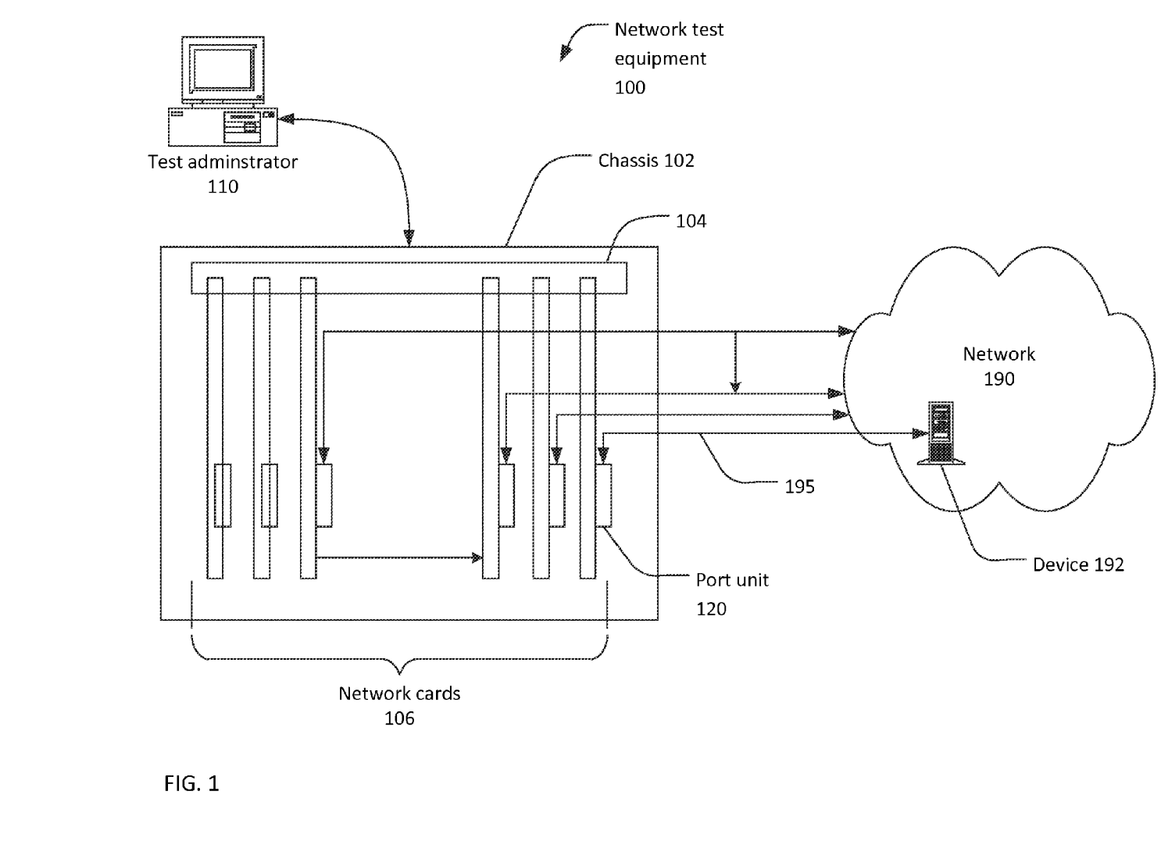
FIG. 1 is a block diagram of a network environment.

FIG. 1 shows a block diagram of a network environment. The environment may include network test equipment 100 and a network 190 which includes one or more network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may support a single communications protocol, may support a number of related protocols, or may support a number of unrelated protocols. One or more network cards 106 or their equivalent may be permanently installed in a self-contained test unit or tests appliance.

Each network card 106 may contain one or more port unit 120. Each port unit 120 may include circuits and software to generate test traffic and/or to receive and analyze test traffic. Each port unit may be coupled to the test administrator 105. Each port unit 120 may connect to the network 190 through one or more ports. Each port unit 120 may be connected to the network 190 through a communication medium 195, which may be a wire, an optical fiber, a wireless link, or other communication medium.

The backplane 104 may serve as a bus or communications medium for the network cards 106. The backplane 104 may also provide power to the network cards 106.

The network test equipment 100 may also include a test administrator 110. The test administrator 110 may be a computing device included within or coupled to the chassis 102. The test administrator 110 may include an operator interface (not shown) that may be used to plan a test session, to control the test session, and/or to view test results during and after the test session. The operator interface may include, for example, a display and a keyboard, mouse, and/or other input devices (not shown). The test administrator 110 may include or be coupled to a printer or other data output device (not shown) for output of test results. The test administrator 110 may include or be coupled to a storage device (not shown) for storing test data and results for future review and/or analysis.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel.

The one or more network devices 192 may be any devices capable of communicating over the network 190. The one or more network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the one or more network devices 192 may include appliances, alarm systems, and any other device or system capable of communicating over a network. The network 190 may consist of a single network device 192 or a plurality of network devices interconnected by a plurality of communications paths, all of which will be referred to herein as the network under test (NUT).

Figure 2:
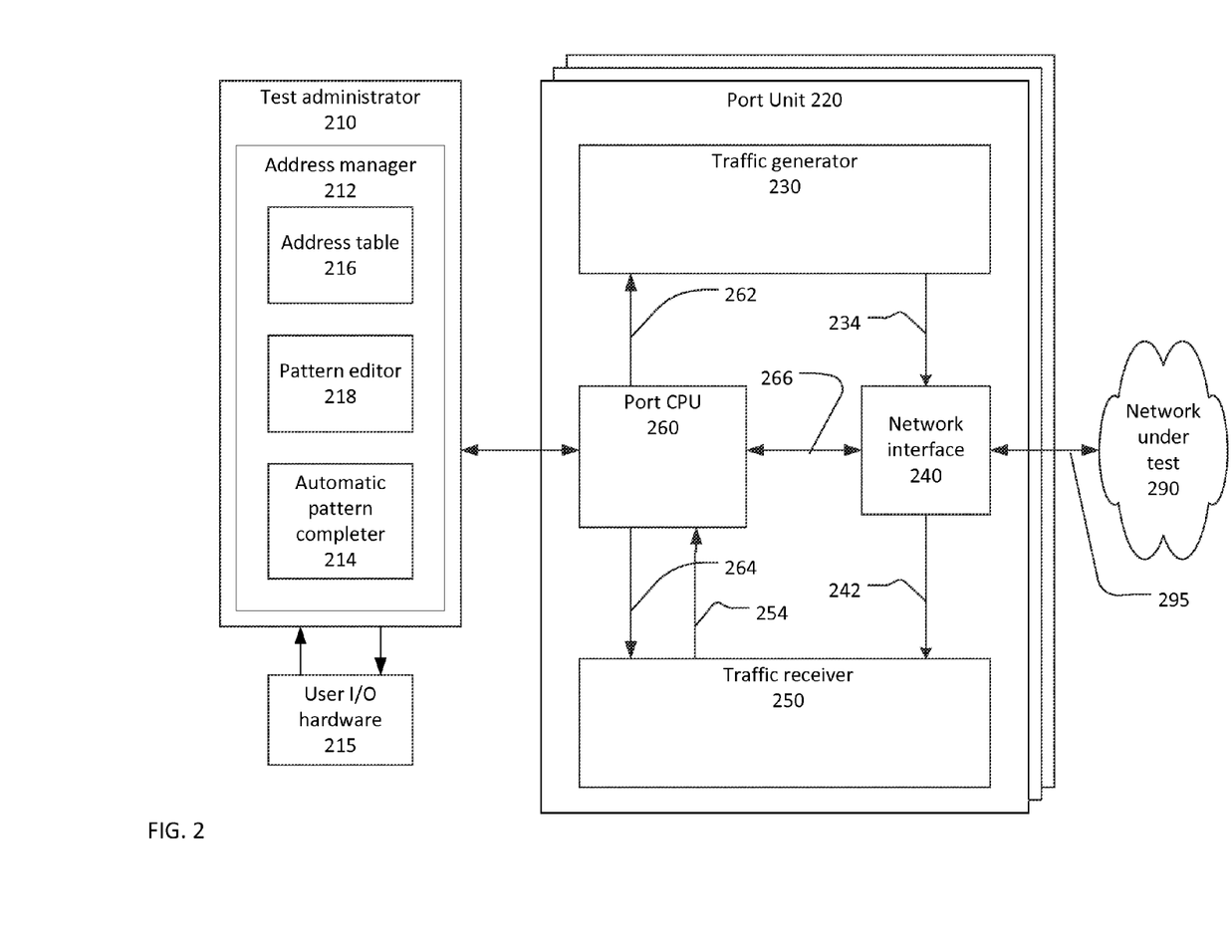
FIG. 2 is a block diagram of a test system.

Referring now to FIG. 2, a test system 200, which may be the network test equipment 100 may includes a test administrator 210 coupled to a plurality of port units including an exemplary port unit 220. The port unit 220 may include a port central processor unit 260 (CPU), a traffic generator unit 230, a traffic receiver unit 250, and a network interface unit 240 which couples the port unit 220 to a network under test 290. The port unit 220 may be all or part of a network card such as the network cards 106.

The port CPU 260 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 260 may provide the traffic generator unit 230 with stream forming data 262 to form a plurality of streams. The stream forming data 262 may include, for example, the type of packet, the frequency of transmission, definitions of fixed and variable-content fields within the packet and other information for each packet stream. The traffic generator unit 230 may then generate the plurality of streams in accordance with the stream forming data 262. The plurality of streams may be interleaved to form outgoing traffic 234. Each of the streams may include a sequence of packets. The packets within each stream may be of the same general type but may vary in length and content.

The network interface unit 240 may convert the outgoing traffic 234 from the traffic generator unit 230 into the electrical, optical, or wireless signal format required to transmit the test traffic to the network under test 290 via a link 295. The link 295 may be a wire, an optical fiber, a wireless link, or other communication link. Similarly, the network interface unit 240 may receive electrical, optical, or wireless signals from the network over the link 295 and may convert the received signals into incoming traffic 242 in a format usable to the traffic receiver unit 250.

The traffic receiver unit 250 may receive the incoming traffic 242 from the network interface unit 240. The traffic receiver unit 250 may determine if each received packet is a member of a specific flow, and may accumulate test statistics for each flow in accordance with test instructions 264 provided by the port CPU 260. The accumulated test statistics may include, for example, a total number of received packets, a number of packets received out-of-sequence, a number of received packets with errors, a maximum, average, and minimum propagation delay, and other statistics for each flow. The traffic receiver unit 250 may also capture and store specific packets in accordance with capture criteria included in the test instructions 264. The traffic receiver unit 250 may provide test statistics and/or captured packets 254 to the port CPU 260, in accordance with the test instructions 264, for additional analysis during, or subsequent to, the test session.

Some amount of interactive communications may be required between the port unit 220 and the network under test 290 during a test session. The interactive communications may include, for example, TCP connections and application-layer transactions. Such traffic may be initiated, managed, and processed by the port CPU 260 and thus may be referred to as "CPU traffic". As shown in FIG. 2, the port CPU 260 may be coupled to the network interface unit 240 such that CPU traffic 266 may be communicated between the port CPU 260 and the network under test 290 via the network interface unit 240. Although not shown in FIG. 2, outgoing CPU traffic may be routed from the Port CPU 260 to the network interface unit 240 via the traffic generator unit 230, and incoming CPU traffic may be routed from the network interface unit to the port CPU via the traffic receiver unit 250.

The port CPU 260 may communicate with a test administrator 210, which in turn may communicate with or include user I/O hardware 215. The test administrator 210 may be a computing device connected to the port unit 220 via a bus, a network, or another communications path. The user I/O hardware 215 may include at least one display device and one or more input devices such as a keyboard, a mouse or other pointing device, and/or a touch screen.

The hardware and software of the test administrator 210 may perform multiple functions including an address manager 212. The address manager 212 may use a pattern editor 218 and/or an automatic pattern completer 214 to develop an address table 216 that may be stored in memory within the test administrator 210. The address table 216 may include a list of addresses, such as internet protocol addresses, that will be assigned to port units during a test session.

The test administrator 210 may provide the port CPU 260 of each port unit 220 with instructions, parameters, and data required for each port unit to participate in testing the network under test 290. The instructions and data provided by the test administrator to each port unit 220 may include, for example, data enabling or disabling various capabilities and protocols, operational parameters, definitions of packet streams to be generated by the port unit and definitions of performance statistics to be accumulated by the port unit. The instructions and data provided by the test administrator 210 to each port unit 220 may include one or more addresses assigned to the port unit as defined in the address table 216. During a test session, each port unit 220 may emulate a plurality of virtual devices communicating via the network under test 290. The test administrator 210 may provide each port unit 220 with one or more addresses for each virtual device to be emulated.

Figure 3:
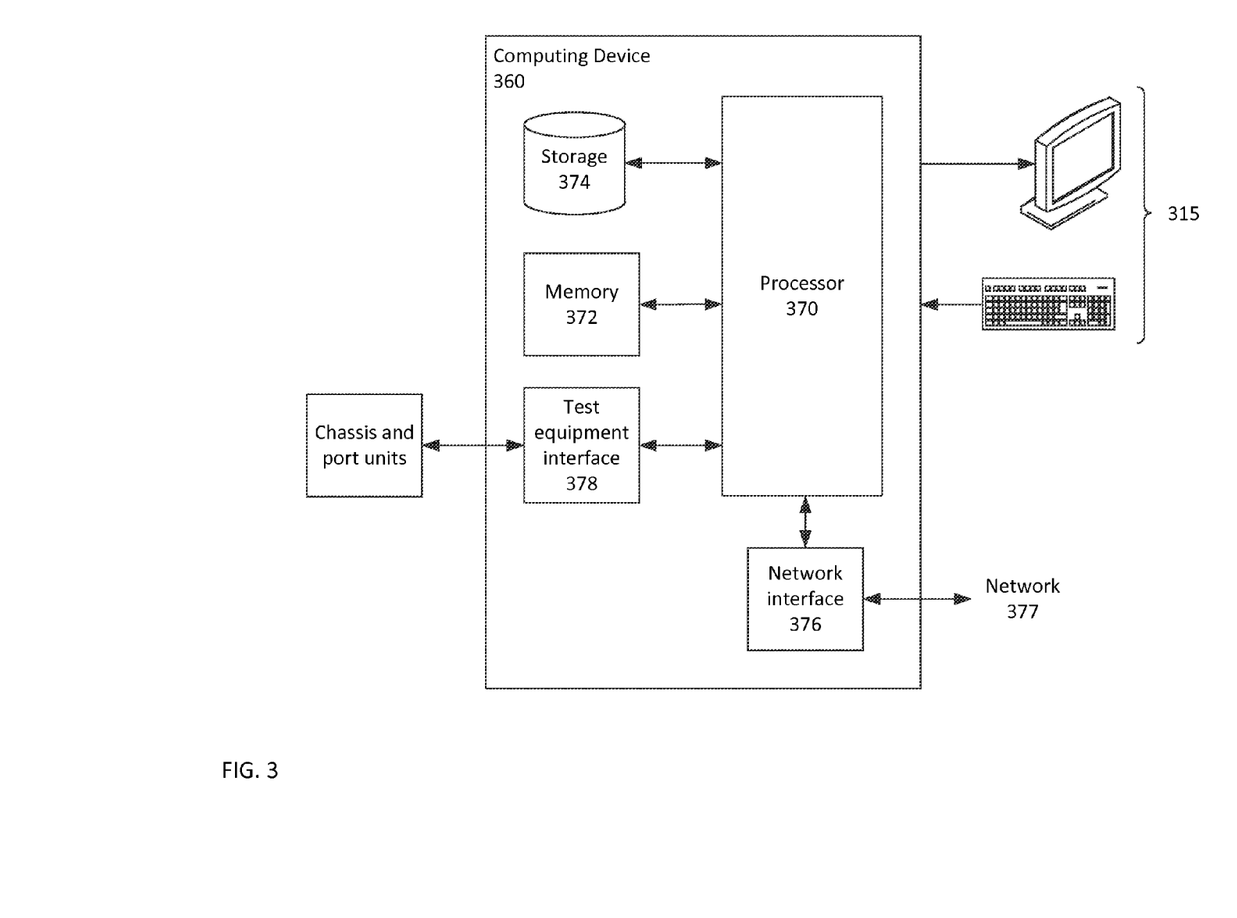
FIG. 3 is a block diagram of a computing device.

Referring now to FIG. 3, a computing device 310, which may be the test administrator 210, may include at least one processor 370 coupled to a memory 372. The processor 370 may be a single processor, multiple processors, or multiple processor cores within one or more processor circuit devices. The memory 372 may be static and/or dynamic random access memory or a combination of random access memory and other memory such as nonvolatile writable memory and read only memory. The memory 372 may temporarily or permanently store software instructions for execution by the processor 370 and data for use during the execution of those instructions.

The processor 370 may be coupled to a network 377, which may be or include the Internet, via a network interface 376. The processor 370 may be coupled to a user interface 315, which may includes a display and a keyboard and other devices that are not shown. The processor 370 may be configured to communicate with test equipment, such as the chassis 102 and network cards 106, via a test equipment interface 378. The test equipment interface 378 may be coupled to the chassis and port units via a bus, a network, and/or other communications paths which may be wired, fiber optic, or wireless.

The computing device 360 may execute an operating system, including, for example, variations of the Linux, Microsoft® Windows®, and Apple® Mac® operating systems. To access the Internet, the client computer may run a browser such as Microsoft® Explorer® or Mozilla® Firefox®, and an e-mail program such as Microsoft® Outlook® or Lotus Notes®. The computing device 360 may execute one or more application programs to perform the actions and methods described herein.

The operating system and/or application programs may be stored in the form of instructions on a machine readable storage medium within a storage device 374 coupled to the processor 370. Machine readable storage media include, for example, magnetic media such as hard disks, floppy disks and tape; optical media such as compact disks (CD-ROM and CD-RW) and digital versatile disks (DVD and DVD±RW); flash memory cards; and other storage media. Within this patent, the term "storage medium" refers to a physical object capable of storing data. The term "storage medium" does not encompass transitory media, such as propagating signals or waveforms.

Description of Processes

Figure 4:
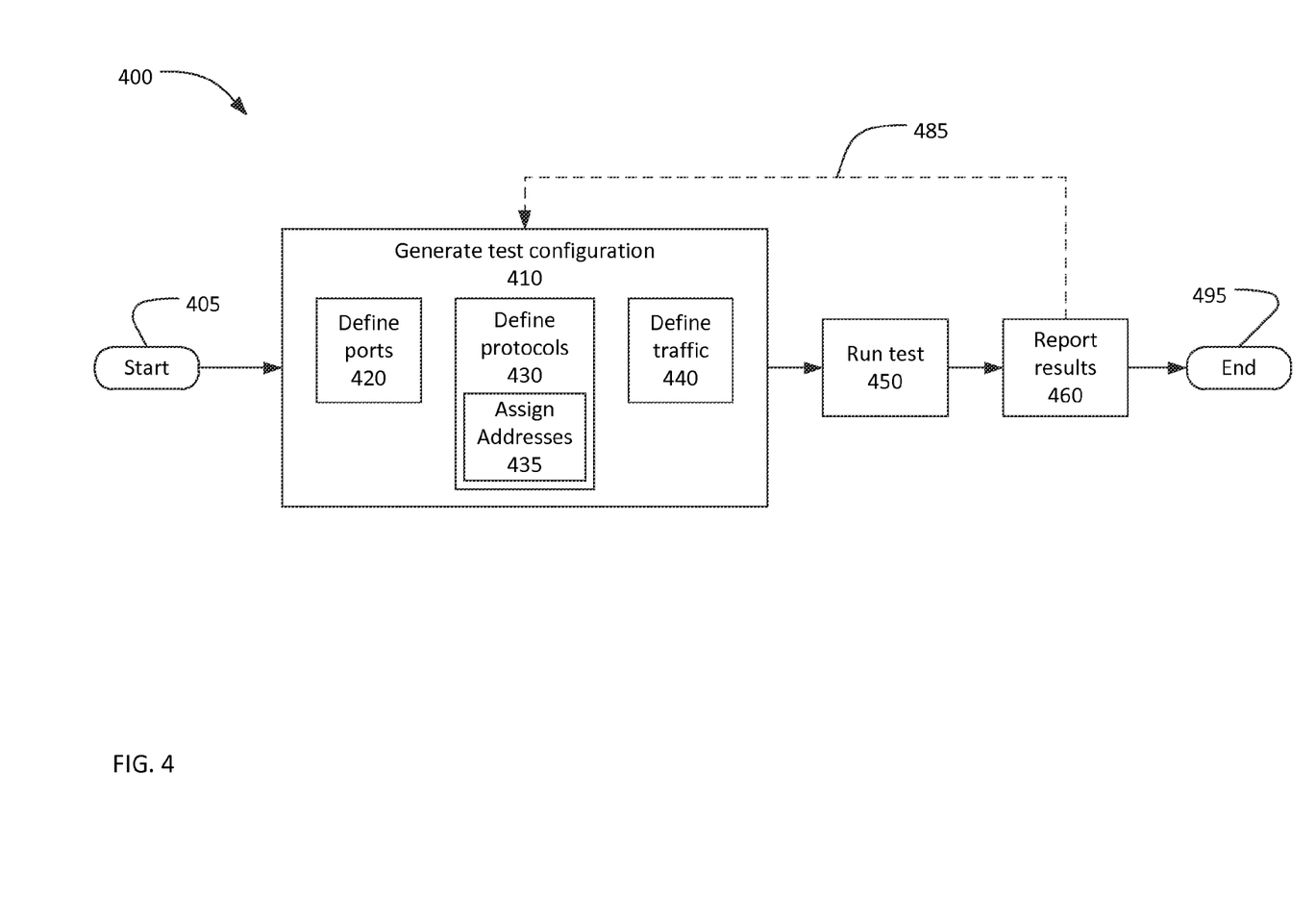
FIG. 4 is a flow chart of a process for testing a NUT.

Referring now to FIG. 4, a process 400 for testing a NUT may start at 405 and finish at 495. The process 400 may be executed within a test environment such as that shown in FIG. 1. The process 400 may be performed using a test administrator, such as the test administrator 210, in conjunction with a plurality of port units, such as the port unit 220. The process 400 may be used to test a network such as the network 190 and/or a network device such as the network device 192.

The process 400 may include generating a test configuration at 410, running a test session according to the test configuration at 450, and reporting test results at 460. For ease of description, these actions are shown to be sequential in FIG. 4. However, these actions may be performed, to at least some extent, concurrently. For example, interim test results may be reported at 460 while a test session is still running at 450. Further, the process 400 may be, to at least some extent, cyclic. For example, interim test results reported at 460 may be used to modify the test configuration, either automatically or as a result of some user action, as indicated by dashed line 485.

In this patent, the term "automatically" means "without user participation". A function performed automatically may be performed by hardware or by a combination of hardware, firmware, and/or software. For example, a function performed automatically may be performed by a computing device executing software instructions.

Generating a test configuration at 410 may include, at 420, defining a plurality of ports to be used to test the NUT. Each port may be defined by a set of port attributes describing the hardware and physical layer configuration of the port. Port attributes may include, for each port, identification of the hardware used to implement the port, the physical layer protocol implemented by the port, parameters to be used by the port, and other data. For example, the hardware may be identified by a model or part number of a line card and a chassis. The physical layer protocol may be an Ethernet protocol, ATM (asynchronous transfer mode, PoS (packet over Synchronous Optical Networking/Synchronous Digital Hierarchy), Fibre Channel, or some other physical layer protocol. Parameters included in the port attributes may include, for example, a physical layer address for the port, a data rate or interface type, a selection of a cyclic redundancy code (e.g. 16-bit or 32-bit), and parameters defining whether or not optional features (e.g. flow control, data scrambling, auto negotiation of data rates, etc.) are enabled.

A port unit, such as the port unit 220, may include hardware and software for 50 or more different protocols for data communications, security, network control, and routing. Depending on the nature of the tests to be performed during a test session, each port may typically use only a portion of the total number of protocols within its capability. Generating a test configuration at 410 may include, at 430, defining a layer 2/3 protocol suite which is a subset of the available protocols that will be active at each port. Defining the layer 2/3 protocol suite may include identifying layer 2 and layer 3 protocols to be usable at each port and defining all protocol attributes to be used by the ports. The term "protocol attributes" includes all parameters and data necessary for the use of the identified protocols. Many, but not all, protocols require one or more attribute to be defined.

A common example of a protocol attribute is an IPv4 or IPv6 address which may be assigned at 435. During a test session, each port may emulate a plurality of virtual devices connected to the network under test. For example, a single port may emulate an entire local area network or a large number of client computers. Thus, at 435, each port may be assigned a unique address for each of a plurality of virtual devices to be emulated by the port during the test session.

Generating a test configuration at 410 may also include, at 440, defining the traffic to be generated by the ports while testing the NUT. The test traffic and the data used to define the test traffic may depend on the type of network or device to be tested. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant. However, when the NUT operates at a higher layer of the network structure (for example, a server, a server load balancer, a network security device that performs packet inspection, and other network devices), the test traffic may include or be a plurality of simulated TCP connections or simulated application-layer transactions. In this case, the test traffic may be defined at 440 in terms of TCP connections, application layer transaction (e.g. HTTP Put and Get transactions), or emulated user activities, each of which causes some traffic to be generated and transmitted via the NUT.

Figure 5:
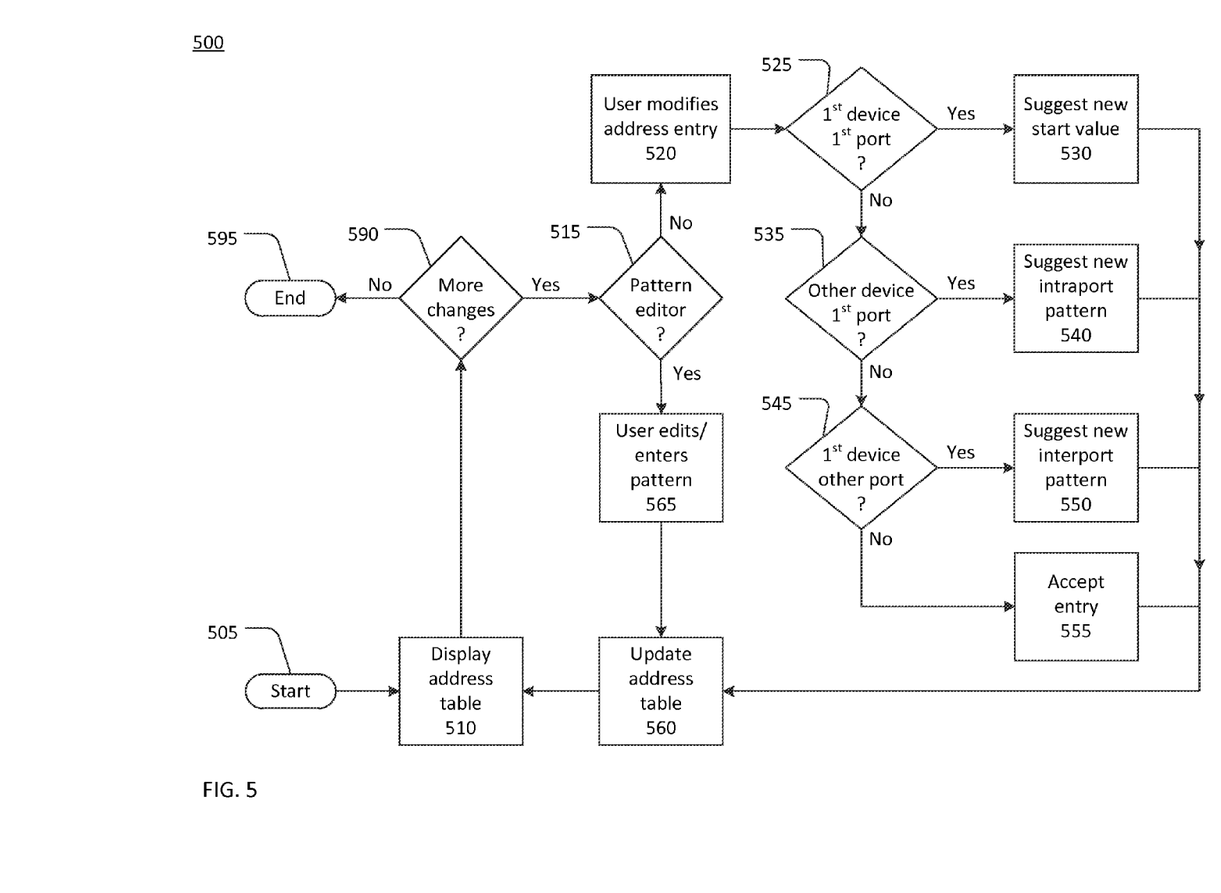
FIG. 5 is a flow chart of a process for automatically assigning addresses in a test configuration.

Referring now to FIG. 5, a process 500 for assigning addresses in a test configuration may be suitable for use at 435 in the process 400. The process 500 may start at 505 after the ports to be used in a test session have been defined. The process 500 may end at 595 after addresses have been assigned to all virtual devices to be emulated during the test session. Once finished, the process 500 may be repeated in whole or in part if changes are made to the port definitions in the course of defining a test configuration. The process 500 may be cyclic, to some extent, and the actions from 510 to 565 may be repeated multiple times as needed to assign addresses to all of the virtual devices.

At 520, an address table may be displayed to a user. The user may be, for example, a test engineer responsible for assigning addresses for a test configuration. The address table may be displayed as part of a graphical user interface that allows the user to view and modify the assigned addresses. When the process 500 is first started, the initial address table may be automatically populated with default address values.

Figure 6:
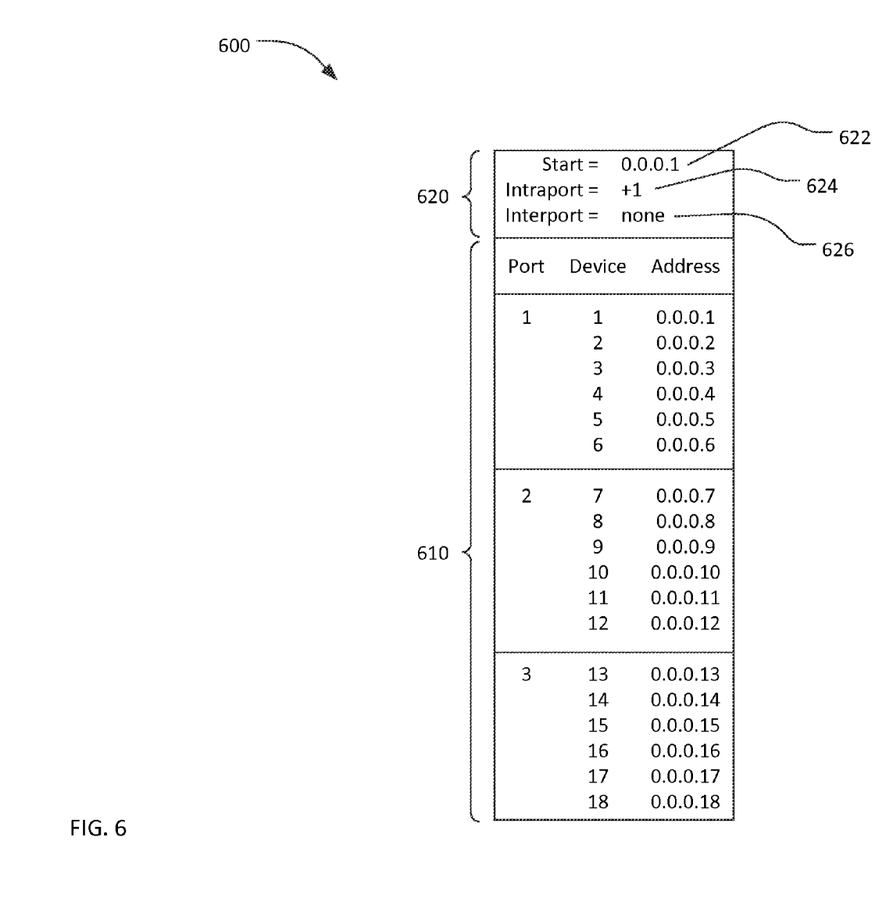
FIG. 6 is a device address table.

FIG. 6 is an example of a displayed address table populated with default address values. The address table may include a tabular list 610 of the ports of the test configuration, the number of virtual devices to be emulated by each port, and the addresses assigned to each device. For ease of description, 32-bit IPv4 addresses are assumed. Each address is written in the conventional manner as "a.b.c.d" where a, b, c, and d are the values of the four octets of the 32-bit address, expressed as integers in the range from 0 to 255.

In the example of FIG. 6, the test configuration includes three ports, numbered 1, 2, and 3. Each port will emulate six virtual devices, numbered from 1 to 18. An actual test configuration may include more or fewer, and possible many more, than three ports. An actual test configuration may include more or fewer, and possible many more, than six virtual devices per port. Since only a small portion of an address table for a large test configuration may be displayed at any time, the graphical user interface may include controls to allow the user to scroll, jump, or otherwise navigate through the entire address table.

To allow a user to efficiently assign addresses to a large number of virtual devices, the device addresses may be assigned in accordance with a master pattern. The master pattern may include three elements—a start value, an "intraport pattern", and an "interport pattern". The start value may be the address assigned to the first virtual device emulated by the first port. The intraport pattern may be a pattern of steps or changes between the addresses assigned to virtual devices emulated by the same port. The interport pattern may be a pattern of steps or changes between the addresses assigned to the first virtual device emulated by different ports.

The address table displayed at 510 may include a pattern definition area 620. The pattern definition area 620 may include a start address 622, an intraport pattern 624, and an interport pattern 626. In the example of FIG. 6, the start address 622 is 0.0.0.1. The intraport pattern 624 is "+1" indicating that 1 (i.e. 0.0.0.1) is added to each address to provide the address for the subsequent virtual device. The interport pattern 626 is "none" indicating that there in not a pattern of steps between the devices assigned to different ports. In this case, the intraport pattern may be continued between ports.

Throughout this patent, the notation used to define the interport and intraport patterns is exemplary. Different notation may be used to describe the interport and intraport patterns to the user.

In the tabular list 610, the assigned addresses begin at 0.0.0.1, as defined by the start address 622 in the pattern definition area 620. Each subsequent address is equal to the previous address incremented by one, as defined by the intraport pattern 624. The pattern of incrementing each subsequent address by one is continued across the three ports, consistent with the absence of an interport pattern 626. Thus that the 18 virtual devices receive consecutive IPv4 addresses from 0.0.0.1 to 0.0.0.18. Assigning virtual devices sequential addresses is an example of a default address scheme. Other default address schemes may be used.

Returning now to FIG. 5, at 590 the user may determine whether or not the address table displayed at 510 is satisfactory. If no more changes are required, the process 500 may end at 595. When the process 500 is first initiated and the default addresses are displayed at 510, changes to the assigned addresses are likely required. When changes to the address assignments are required, the user may elect at 515 to enter the changes using an address pattern editor, such as the address pattern editor 218, or using an automatic pattern completer, such as the automatic pattern completer 214.

To use the automatic address pattern completer ("no" at 515), the user may modify an address entry in the display address table at 520. At 525, the automatic pattern completer may determine whether or not the address modified by the user at 520 was the address of the first virtual device of the first port. If the address modified by the user was the address of the first virtual device of the first port, at 530 the automatic pattern completer will suggest the address entered by the user as a new start value.

Figure 7A:
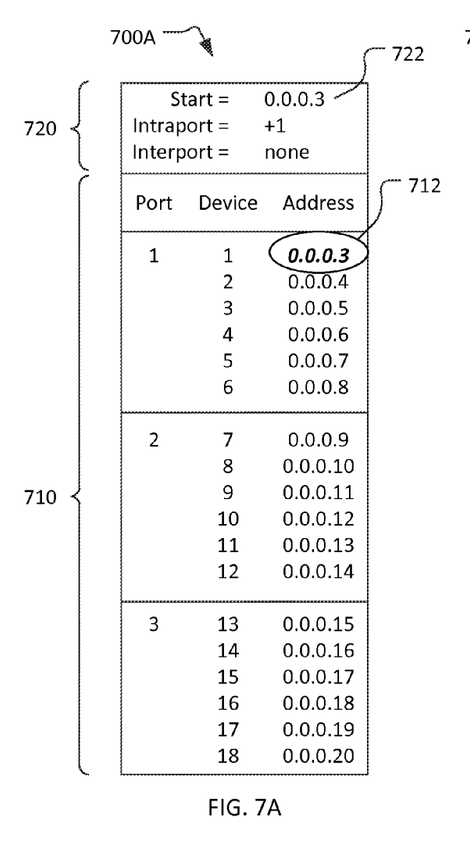
FIGS. 7A, 7B, and 7C are device address tables illustrating actions within the process of FIG. 5

FIG. 7A shows an address table 700A resulting from a user modifying the address table 600 of FIG. 6 by changing the address of device 1. In this example, the user has entered the value "0.0.0.3" for the address 712 of device 1. In response, the automatic pattern completer has suggested "0.0.0.3" for the start address 722 in the pattern definition area 720 of the table 700A. Additionally, the automatic pattern completer has changed the address of all 18 devices consistent with the new start address, such that the devices are assigned consecutive address from 0.0.0.3 to 0.0.0.20.

Referring back to FIG. 5, when a determination is made at 525 that the address modified by the user was not the address of the first virtual device at the first port, the automatic pattern completer may determine at 535 whether or not the address changed by the user at 520 was the address of another virtual device of the first port. If the address changed by the user was the address of another virtual device of the first port, at 540 the automatic pattern completer will analyze the address or addresses that have been entered for devices on the first port and suggest a new intraport pattern.

To suggest a new intraport pattern, the automatic pattern completer may examine a series of addresses starting with the first virtual device and extending through the highest-number virtual device where the address was changed by the user. The automatic pattern complete may determine the step size between adjacent address in this series. This sequence of steps may be suggested as the new intraport pattern. This pattern may then be repeated starting after the highest-number virtual device changed by the user.

Figure 7B:
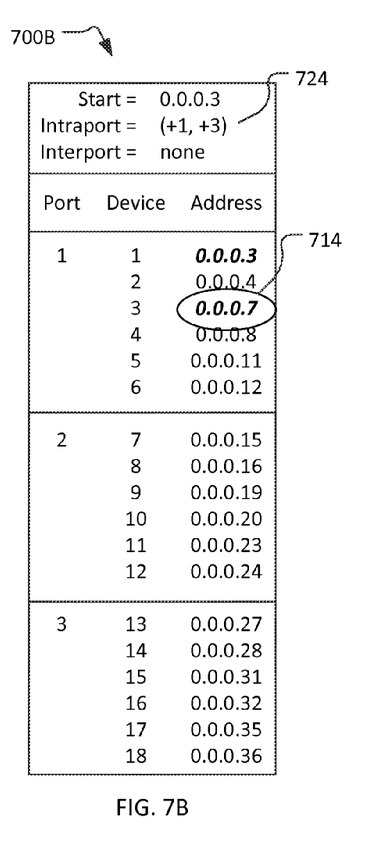

FIG. 7B shows an address table 700B resulting from a user modifying the address table 700A of FIG. 7A by changing the address of device 3. In this example, the user has entered the value "0.0.0.7" for the address 714 of device 3. In response, the automatic pattern completer examined the address of the first three virtual devices and determine that the address step between device 1 and device 2 is 0.0.0.1, and the address step between device 2 and device 3 is 0.0.0.3. Thus the automatic pattern completer has suggested an intraport pattern 724 of "(+1, +3)", indicating alternate steps of 0.0.0.1 and 0.0.0.3. Additionally, the automatic pattern completer has changed the address of all 18 devices consistent with the new intraport pattern.

Referring back to FIG. 5, when determinations are made at 525 and 535 that the address modified by the user was not the address of a virtual device at the first port, the automatic pattern completer may determine at 545 whether or not the address changed by the user at 520 was the address of a first virtual device at some other port. If the address changed by the user was the address of a first virtual device at some other port, at 550 the automatic pattern completer will analyze the address or addresses that have been entered for first devices on multiple port and suggest a new interport pattern.

To suggest a new interport pattern, the automatic pattern completer may examine a series of addresses starting with the address of the first device on the first port and extending through the highest port where the address of the first device was changed by the user. The automatic pattern completer may determine the step size between adjacent address in this series. This sequence of steps may be suggested as the new interport pattern. This pattern may then be repeated starting with the highest port where the address of the first device was changed by the user.

Figure 7C:
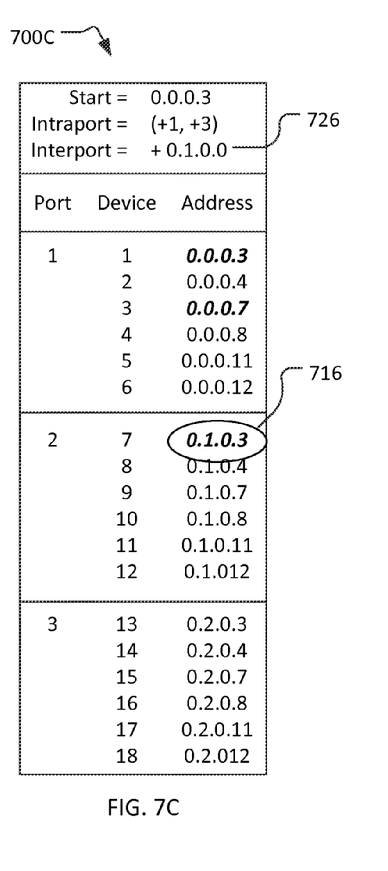

FIG. 7C shows an address table 700C resulting from a user modifying the address table 700B of FIG. 7B by changing the address of device 7 (the first device on the second port). In this example, the user has entered the value "0.1.0.3" for the address 716 of device 7. In response, the automatic pattern completer examined the address of the first device on the first and second ports and determined that the address step between these ports is 0.1.0.0. Thus the automatic pattern completer has suggested an interport pattern 726 of "0.1.0.0". Additionally, the automatic pattern completer has changed the address of device 13 (the first device on port 3) to 0.2.0.3, and has changed the addresses of device 9-12 and 14-18 consistent with the intraport pattern.

Referring back to FIG. 5, if the user attempts at 520 to modify an address that is not the address of a virtual device at the first port or the address of a first virtual device at some other port, the determinations are made at 525, 535, and 545 will be "no". In this situation, the modification proposed by the user may not be useful to define a new start value, a new intraport pattern or a new interport pattern. Further, the modification proposed by the user may not be consistent with previously defined interport and intraport patterns. Such a change made by the user may be accepted at 555 as a unique entry that overrides the address value set by the interport and intraport patterns without affecting the patterns or the addresses of any other virtual devices. Alternatively, this situation may be avoided by allowing the user to change only the addresses for virtual devices emulated by the first port and the addresses for the first virtual device emulated by each other port.

Returning to 515, the user may elect to use a pattern editor, instead of the automatic pattern completer, to modify the address table displayed at 510. At 565, the pattern editor may allow the use to directly enter and edit the start address value, the intraport pattern, and the interport pattern. The intraport and interport patterns may be using a predefined notation, as tables, or in some other format.

Figure 8:
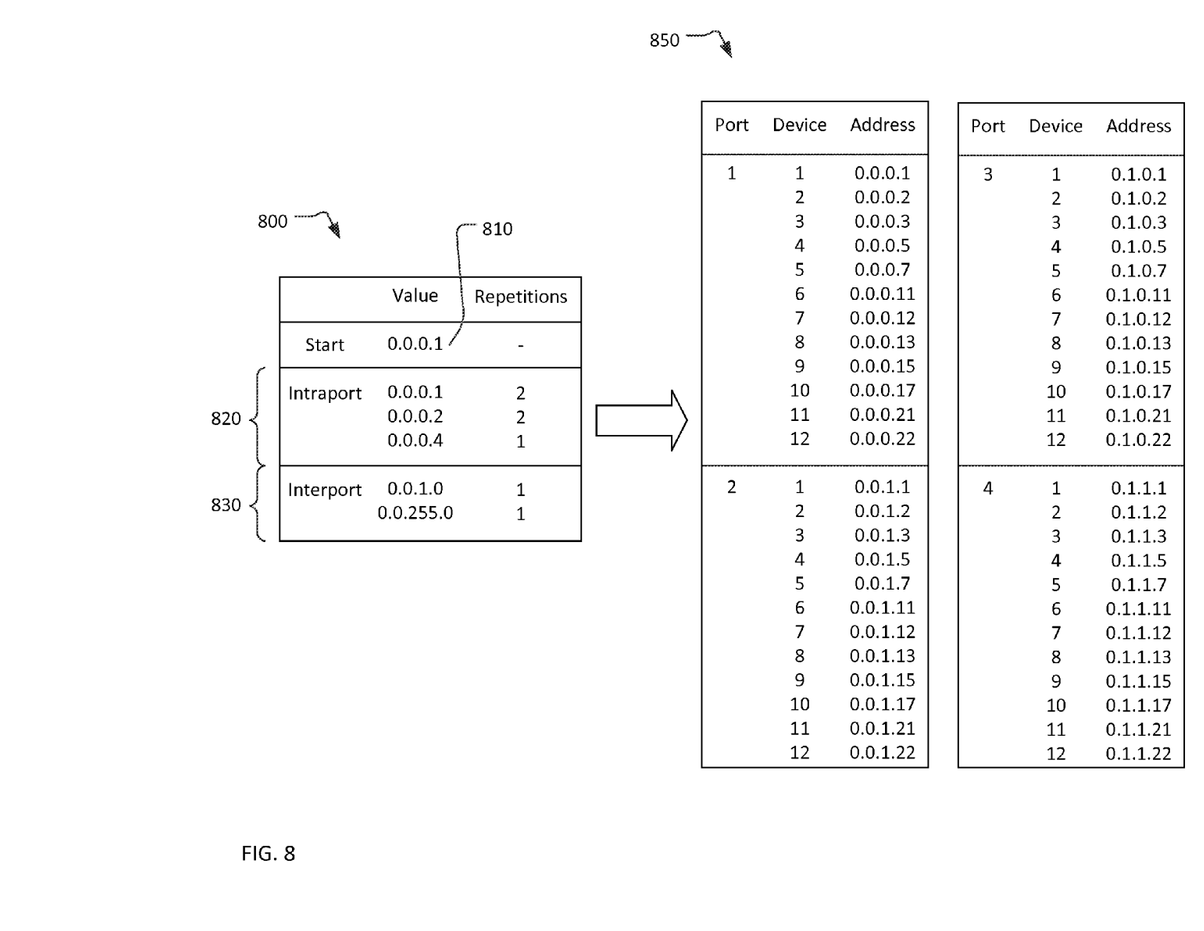
FIG. 8 shows an exemplary pattern editor entry screen and a corresponding device address table.

FIG. 8 shows an exemplary data entry display window 800 suitable for entering information into the pattern editor at 565. The data entry display window 800 has provisions for entering a start value 810, an intraport pattern table 820, and an interport pattern table 830. In this example, a start value 810 of "0.0.0.1" has been entered using the conventional notation for IPv4 addresses.

The intraport pattern table 810 may list pairs of values consisting of a step size and a number of repetitions (the number of consecutive steps of the given step size). In this example, the intraport pattern has been defined a two steps of 0.0.0.1 followed by two steps of 0.0.0.2 followed by one step of 0.0.0.4, after which the pattern repeats. The defined steps and repetitions may be applied to the address of virtual devices within each port. The example intraport pattern will result in a sequence of addresses as follows: 0.0.0.1 (start value), 0.0.0.2 (step by 1), 0.0.0.3 (step by 1), 0.0.0.5 (step by 2), 0.0.0.7 (step by two), 0.0.0.11 (step by 4), 0.0.0.12 (step by one, repeating the pattern).

The interport pattern table 820 may similarly list pairs of values consisting of a step size and a number of repetitions (the number of consecutive steps of the given step size). The defined steps and repetitions may be applied to the address of the first virtual device in different ports. In this example, the interport pattern has been defined a step of 0.0.1.0 followed by a step of 0.0.255.0, after which the pattern repeats. The defined steps and repetitions may be applied to the address of the first virtual device emulated by each port. The example interport pattern will result in the following sequence of addresses for the first device on each port: 0.0.0.1 (start value), 0.0.1.0 (step by 0.0.1.0), 0.1.0.1 (step by 0.0.255.0), 0.1.1.1 (step by 0.0.1.0), 0.2.0.1 (step by 0.0.255.0, repeating the pattern). In IPv4 addressing, the maximum value of each of the four octets is 255, so an interport step of 0.0.255.0 results in a change (seen between ports 2 and 3) from 0.0.1.1 to 0.1.0.1.

FIG. 8 also shows an exemplary address table 850 generated using the patterns defined in the data entry display window 800.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for managing virtual device addresses in a network test system, the network test system comprising a plurality of ports including a first port, the method comprising:
   defining a respective plurality of virtual devices to be emulated by each of the plurality of ports, each plurality of virtual devices including a respective first virtual device; and
   automatically assigning addresses to each of the virtual devices in accordance with a start value to be assigned as an address of the first virtual device emulated by the first port, an intraport pattern that defines a repeating sequence of steps between addresses of virtual devices emulated by the same port, and an interport pattern that defines a repeating sequence of steps between addresses of first virtual devices emulated by different ports.

2. The method of claim 1, further comprising:
   receiving a user entry of a modified address for one of the virtual devices;

automatically modifying one of the start value, the intraport pattern, and the interport pattern based on the user input; and automatically modifying the addresses assigned to one or more other virtual devices based on the modified one of the start value, the intraport pattern, and the interport pattern.

3. The method of claim 2, wherein
when the user enters a modified address for the first virtual device on the first port, the start value is set equal to the modified address.

4. The method of claim 2, wherein
when the user enters a modified address for a virtual device on the first port other than the first virtual device, the intraport pattern is modified based on the modified address.

5. The method of claim 2, wherein
when the user enters a modified address for the first virtual device on a port other than the first port, the interport pattern is modified based on the modified address.

6. The method of claim 2, further comprising:
prior to receiving the user entry, displaying an address table listing addresses assigned to some or all of the virtual devices; and
after automatically modifying the addresses, displaying a revised address table including some or all of the modified addresses.

7. The method of claim 1, further comprising:
receiving a user entry modifying one of the start value, the intraport pattern, and the interport pattern based on the user input; and
automatically modifying the addresses assigned to one or more virtual devices based on the modified one of the start value, the intraport pattern, and the interport pattern.

8. An address manager for a network test system, comprising:
a computer readable storage medium storing instructions that, when executed, cause a computing device to perform a method for assigning virtual device addresses in a network test system, the network test system comprising a plurality of ports including a first port, the method comprising:
defining a respective plurality of virtual devices to be emulated by each of the plurality of ports, each plurality of virtual devices including a respective first virtual device; and
automatically assigning addresses to each of the virtual devices in accordance with a start value to be assigned as an address of the first virtual device emulated by the first port, an intraport pattern that defines a repeating sequence of steps between addresses of virtual devices emulated by the same port, and an interport pattern that defines a repeating sequence of steps between addresses of first virtual devices emulated by different ports.

9. The address manager of claim 8, the method further comprising:
receiving a user entry of a modified address for one of the virtual devices;
automatically modifying one of the start value, the intraport pattern, and the interport pattern based on the user input; and
automatically modifying the addresses assigned to one or more other virtual devices based on the modified one of the start value, the intraport pattern, and the interport pattern.

10. The address manager of claim 9, wherein
when the user enters a modified address for the first virtual device on the first port, the start value is set equal to the modified address.

11. The address manager of claim 9, wherein
when the user enters a modified address for a virtual device on the first port other than the first virtual device, the intraport pattern is modified based on the modified address.

12. The address manager of claim 9, wherein
when the user enters a modified address for the first virtual device on a port other than the first port, the interport pattern is modified based on the modified address.

13. The address manager of claim 9, the method further comprising:
prior to receiving the user entry, displaying an address table listing addresses assigned to some or all of the virtual devices; and
after automatically modifying the addresses, displaying a revised address table including some or all of the modified addresses.

14. The address manager of claim 8, the method further comprising:
receiving a user entry modifying one of the start value, the intraport pattern, and the interport pattern based on the user input; and
automatically modifying the addresses assigned to one or more virtual devices based on the modified one of the start value, the intraport pattern, and the interport pattern.

15. The address manager of claim 8, further comprising:
a storage device comprising the computer readable storage medium;
a processor and memory coupled to the storage device and configured to execute the stored instructions.

16. A method for managing virtual device addresses in a network test system, the network test system comprising a plurality of ports including a first port, the method comprising:
defining a respective plurality of virtual devices to be emulated by each of the plurality of ports, each plurality of virtual devices including a respective first virtual device;
automatically assigning addresses to each of the virtual devices in accordance with a start value, an intraport pattern, and an interport pattern;
displaying an address table listing addresses assigned to some or all of the virtual devices; and
after automatically assigning addresses to each of the virtual devices and displaying the address table:
receiving a user entry of a modified address for one of the virtual devices,
automatically modifying one of the start value, the intraport pattern, and the interport pattern based on the user input,
automatically modifying the addresses assigned to one or more other virtual devices based on the modified one of the start value, the intraport pattern, and the interport pattern, and
displaying a revised address table including some or all of the modified addresses.

17. A method for managing virtual device addresses in a network test system, the network test system comprising a plurality of ports including a first port, the method comprising:
defining a respective plurality of virtual devices to be emulated by each of the plurality of ports, each plurality of virtual devices including a respective first virtual device;

automatically assigning addresses to each of the virtual devices in accordance with a start value, an intraport pattern, and an interport pattern; and after automatically assigning addresses to each of the virtual devices and displaying the address table:
  receiving a user entry of a modified address for one of the virtual devices,
  automatically modifying one of the start value, the intraport pattern, and the interport pattern based on the user input, and
  automatically modifying the addresses assigned to one or more other virtual devices based on the modified one of the start value, the intraport pattern, and the interport pattern, wherein
  when the user enters a modified address for the first virtual device on the first port, the start value is set equal to the modified address,
  when the user enters a modified address for a virtual device on the first port other than the first virtual device, the intraport pattern is modified based on the modified address, and
  when the user enters a modified address for the first virtual device on a port other than the first port, the interport pattern is modified based on the modified address.

* * * * *